(No Model.)
C. J. VAN DEPOELE.
ELECTRIC RAILWAY BRAKE.
No. 438,452.  Patented Oct. 14, 1890.
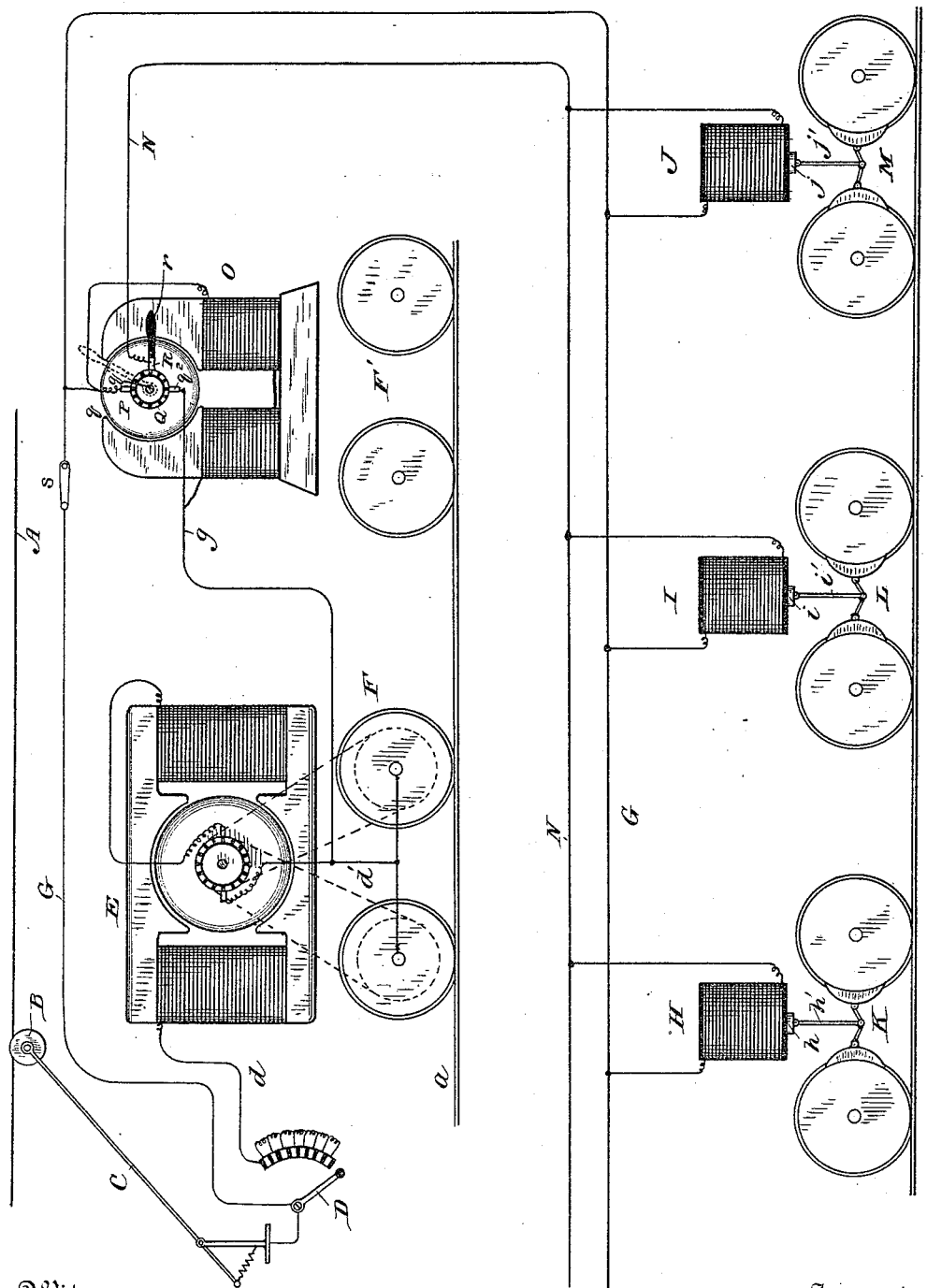
Witnesses
H. A. Lamb
Stephen Jarmus
Inventor
Charles J. VanDepoele
By his Attorney
Frankland Jarmus

UNITED STATES PATENT OFFICE.

CHARLES J. VAN DEPOELE, OF LYNN, MASSACHUSETTS.

ELECTRIC RAILWAY-BRAKE.

SPECIFICATION forming part of Letters Patent No. 438,452, dated October 14, 1890.

Application filed April 9, 1890. Serial No. 347,232. (No model.)

*To all whom it may concern:*

Be it known that I, CHARLES J. VAN DEPOELE, a citizen of the United States, residing at Lynn, in the county of Essex and State of Massachusetts, have invented certain new and useful Improvements in Electric Railway-Brakes, of which the following is a description, reference being had to the accompanying drawings, and to the letters of reference marked thereon.

My invention relates to improvements in means for operating and controlling electrically-actuated brakes or other working-circuits which comprise a fixed resistance to be supplied with current of varying electro-motive force.

It has heretofore been proposed to operate railway-train brakes electrically, the motive force of an iron body moving within the field of force of a solenoid having been applied to actuate the brake mechanism for stopping vehicles and trains. All the methods so far proposed, however, have, I believe, employed wasteful and unreliable artificial resistances as a means of varying and controlling the flow of current in the brake-circuits, rendering such apparatus in most, if not in all, cases practically inoperative by reason of the difficulty encountered in controlling and modifying the force with which the brakes are applied to the wheels, as is absolutely necessary in practice.

According to my present invention I secure the desired effects by means capable of the most delicate adjustment and control, and one which includes no dead resistances, which would be liable to become overheated, if not destroyed, by the long continuous use frequently required of brake apparatus, and which therefore will be found to be very much more reliable in action than any means yet proposed for this and analogous purposes.

The apparatus is illustrated in connection with a number of electric-railway vehicles, and this is for convenience of illustration only, since the invention is not limited to any type of apparatus or class of vehicles, it being obviously necessary, however, on an ordinary steam-railway train to provide a source of current for operating the brake-setting devices.

The details of the invention will be fully hereinafter set forth, and referred to in the appended claims.

The drawing is a diagrammatic view showing the current-collecting devices of an electric railway, an electric-railway motor, the wheels and brake mechanism of a number of vehicles, together with the special devices employed in carrying out my invention, parts of the apparatus being shown in side elevation.

In said drawing, A represents the supply-conductor of an electric railway. B is a contact device engaging the same and collecting current therefrom, which current, as here indicated, is carried down the trolley-pole C and supplied to a switch D, through which it may pass by conductor $d$ to the coil of a motor E for propelling a motor-car, the said car being here indicated by the two sets of wheels F F'. With the arrangement here shown one side of the circuit is represented by the conductor A and the other by the rails $a$ of the track upon which the vehicle is moved. The circuit of the motor E is connected to the track, and thereby completed by a conductor $d'$. From the switch D extends a branch conductor G, which traverses the working-circuit, here shown as a train which is to be electrically braked, said conductor G forming one side of the breaking-circuit, as indicated in the drawings.

A number of sets of brake mechanism are shown diagrammatically, said braking mechanism being represented by solenoids H I J, each solenoid being provided with an iron plunger $h\ i\ j$, said plungers being mechanically connected with brake mechanism by connecting-rods $h'\ i'\ j'$. The specific form of the brake mechanism itself cuts no figure whatever in this case, and therefore the brake mechanism K L M, represented in connection with the moving parts, is understood to be by way of illustration only, since any direct-acting form of brake mechanism capable of being operated by my invention may of course be employed in connection therewith, and it is not considered necessary to illustrate the endless variety of mechanism to which the invention is applicable. One terminal of the brake-actuating solenoids H I J is connected with the conductor G, the other terminals of said solenoids being connected to a second conductor N, the said solenoids being therefore arranged in multiple-arc relation to each other and to their supply-circuit.

In order to produce the variations in the electro-motive force of the supply-current, and thereby to control the action of the breaking solenoids, I provide a counter-electro-motive force and device shown in the form of a motor O. The counter-electro-motive force device O is, for convenience, located upon the motor-car or at or near the point from which the car or train is controlled in position to be easily reached by the motor-man.

The motor O is provided with an armature P of the continuous-current type, which has the usual sectional commutator Q, which is provided with main positive and negative commutator-brushes $q'\ q^2$, and also with a third commutator-contact in the form of a movable comtamutor-brush R, which is supported upon a hand-lever $r$, mounted concentric with the armature-shaft $q$. The positive commutator-brush $q'$ is connected to and receives current from the branch conductor G. The opposite main brush $q^2$ is connected by conductor $g$ with the return-circuit of the system, in this instance represented by the grounded conductor $d'$. The field-magnet circuit of the motor O is desirably connected to the main commutator-brushes in derivation, the motor being operated at constant speed. As stated, one side of the brake-circuit is represented by the conductor G, which is assumed to be capable of supplying any desired amount of current to the solenoids H I J. The other side of the circuit of the solenoids is represented by the conductor N, which extends through the train or throughout the braking-circuit and terminates at the movable commutator-contact R. Therefore all current passing through the said solenoids must flow through the conductor G, returning by way of the conductor N and movable commutator-brush R. Consequently the position of R with respect to the main brushes of the counter-electro-motive-force device will determine the quantity of current which can flow through the circuit G N. When the movable brush R is opposite to the main commutator-brush $q'$, no current whatever will flow in the circuit G N. As soon, however, as the movable brush is moved away from the said stationary brush $q'$ current will begin to flow in the working-circuit, the electro-motive force increasing continually until the moving brush is in position opposite to the other stationary brush $q^2$. When the brush R is moved around into immediate proximity with the other commutator-brush $q^2$, current will flow through the circuit G N and traverse the solenoids H I J to the full extent of their capacity. Therefore by moving the brush R between the stationary brushes $q'\ q^2$ the current in the brake or other working circuit can be regulated with the greatest possible precision, leaving nothing whatever to be desired in the matter of the control of the current and eliminating all wasteful resistance, as well as delicate and easily-destroyed parts. The motor O may be quite a small one, its size depending of course upon the extent and capacity of the working-circuit. It will also be obvious that the armature of the motor need only be in motion during such time as the brake or other apparatus is in use, although it might be found desirable to keep it constantly in motion in order to be prepared for emergencies. A switch S is provided in the conductor G for opening the brake-circuit when desired.

Various changes and modifications may be made in the actual embodiment of the invention, and it will be understood that in showing a train-brake circuit such a circuit affords very favorable opportunities for illustrating the principles of the invention, which is, however, not limited to the operation of any particular type or form of apparatus.

Having described my invention, what I claim, and desire to secure by Letters Patent, is—

1. The combination of a working-circuit, including translating devices of fixed resistance, a continuous-current supply, and an electro-dynamic counter-electro-motive-force device spanning the same, and means for varying the potential of the current supplied to the working-circuit by increasing and decreasing the effect of the counter-electro-motive-force device thereon.

2. An electric-brake system comprising brake-actuating coils connected in a brake-operating circuit, a source of current connected with said circuit, an electro-dynamic counter-electro-motive-force device spanning the main circuit, and means for increasing or decreasing the effect of the counter-electro-motive-force device upon the current flowing in the brake-operating circuit, substantially as described.

3. An electric-brake circuit comprising brake-actuating coils connected in a working-circuit, a continuous-current-supply circuit, a counter-electro-motive-force device spanning the supply-circuit, a movable connection connected to the terminal of one side of the working-circuit, and means for adjusting the movable connection in any position between the points of maximum and zero electro-motive force of the counter-electro-motive-force device, and thereby varying the potential of the working-circuit, substantially as described.

4. A system of electric railway-brakes consisting of electro-magnetic motive devices energized from a source of current flowing in a counter-electro-motive-force device provided with a commutator having two fixed brushes in connection with the supply-current, a third brush or brushes adapted to be moved from the point of highest to lowest electro-motive force upon said commutator, and connections from one of the fixed brushes to one terminal of the brake-circuit, and connections between the movable brush or brushes and the other terminal of said circuit, substantially as described.

5. An electric-braking system comprising a brake or working circuit and brake-actuating coils connected in multiple arc therein, a source of constant current connected to one side of the brake-circuit, a counter-electro-motive-force device spanning the brake-circuit and comprising an electro-dynamic counter-electro-motive-force device having connections between its stationary commutator-brushes and the opposite sides of the brake-circuit a movable connection representing one side of the brake-circuit and consisting of a third commutator-brush arranged to be adjusted toward and away from the stationary commutator-brushes of the motor-armature, and thereby to vary the electro-motive force of the current flowing in the brake-circuit, substantially as described.

In testimony whereof I affix my signature in presence of two witnesses.

CHARLES J. VAN DEPOELE.

Witnesses:
 FRANKLAND JANNUS,
 STEPHEN JANNUS.